Dec. 24, 1968   J. C. BASILETTI ET AL   3,417,738
COMPRESSION RATIO PISTON INCLUDING OIL FILTERING MEANS
Filed Dec. 8, 1967

INVENTORS
WALTER F. ISLEY
JOHN BASILETTI

BY Hauke, Krass, & Gifford
ATTORNEYS

United States Patent Office 3,417,738
Patented Dec. 24, 1968

3,417,738
COMPRESSION RATIO PISTON INCLUDING
OIL FILTERING MEANS
John C. Basiletti, Royal Oak, and Walter F. Isley, Grosse
Pointe Farms, Mich., assignors to Continental Aviation
and Engineering, Detroit, Mich., a corporation of Virginia
Filed Dec. 8, 1967. Ser. No. 689,104
7 Claims. (Cl. 123—78)

ABSTRACT OF THE DISCLOSURE

A two-part variable compression ratio (VCR) piston is provided with an upper and lower chamber, supply valve means connected with the lubrication system of the engine for supplying oil to the chambers in a manner which permits the parts by inertial forces and the forces generated by combustion chamber pressures to move relative to each other at a controlled rate to increase the compression ratio of the engine until a predetermined constant maximum combustion chamber pressure has been achieved and a discharge valve assembly for discharging some of the oil from the upper chamber to the engine crankcase when the pressure in the upper chamber exceeds a predetermined maximum value. A filter ring is carried by the inner member of the piston and the oil is directed through the filter ring before being directed to the discharge valve so that impurities which might retain the discharge valve in an open position are filtered out of the oil before they have a chance to do so.

Background of the invention

The present invention relates to variable compression ratio engines and more particularly to improved hydraulic means for regulating relative movement of the two members which make up the pistons for such engines.

Heretofore various constructions have been disclosed for those engines designed to maintain a predetermined constant maximum combustion chamber pressure. One type of such engine has been disclosed in United States Patents Nos. 3,156,162, 3,161,112, 3,185,137, 3,185,138, 3,303,831, and 3,311,096, as comprising two-part pistons for internal combustion engines in which an inner member or carrier is connected in the usual manner to the connecting rod and carries an outer member or shell which is adapted to move axially to a limited extent relative to the inner member. Clearance spaces are provided between the top and bottom ends of the inner and outer members which form upper and lower variable volume chambers adapted to contain an incompressible fluid such as the oil from the lubrication system of the engine. By regulating the flow of oil to and from these chambers, the movement of the outer member relative to the inner member in response to piston reciprocation and combustion chamber pressure is controlled for varying the clearance volume of the cylinder in which the piston reciprocates so the compression ratio of the engine will be automatically regulated until a predetermined maximum combustion pressure is achieved.

In these types of constructions inlet supply valve means are provided for directing the oil from the lubrication system of the engine to the upper chamber when it is expanding and to the lower chamber when that chamber is expanding. The supply valve means includes means for closing these chambers when they are contracting so that the oil in the chambers acts as a hydraulic lock preventing the parts from expanding or contracting except to the extent allowed by a controlled rate of leakage permitted from the lower chamber through a fixed restricted orifice and from the upper chamber by means of a discharge valve assembly operable to open the upper chamber to crankcase atmosphere when the pressure in that chamber becomes excessive.

It is essential to the proper operation of the engine that the discharge valve assembly close completely upon the predetermined combustion chamber pressure being restored. If the valve is in some way retained in a slightly open position so that there is leakage past the valve member, the engine will not function properly.

Heretofore impurities within the lubrication system of the engine have at some times found their way into the discharge valve assembly and have wedged between the body and valve, and/or valve and its seat to maintain the valve in an open position.

Summary of the present invention

The present invention provides means readily adaptable to present constructions for such engines and which tends to eliminate this problem. Such means takes the form a new valve discharge assembly substantially similar to previously used assemblies but in which the fluid is directed along the surfaces intermediate the inner and the outer members before passing through the discharge valve. The usual upper sealing ring provided in such constructions has been replaced by a filter ring which permits oil to pass but which filters out the impurities before the oil is directed to the discharge valve assembly.

It is an object then of the present invention to improve the construction of VCR piston assemblies by providing means for filtering impurities from the oil used to control the position of the parts of the piston before such impurities interfere with the proper operation of the discharge valve.

It is another object of the present invention to permit existing variable compression ratio piston assemblies to be improved by the provision of filtering means for the oil discharged from the upper chamber by providing a new discharge valve assembly adapted to replace existing discharge valves, a filter ring adapted to replace the sealing ring presently in such constructions and with the provision of a new passage to the discharge valve assembly being operable to direct oil from the upper chamber past the filter ring and through the discharge valve assembly.

Brief description of the drawings

Further objects and advantages of the present invention will readily occur to one skilled in the art to which the invention pertains upon reference to the following description which refers to the accompanying drawings in which like characters refer to like parts throughout the several views and in which.

Description of a preferred embodiment

Figure 1:
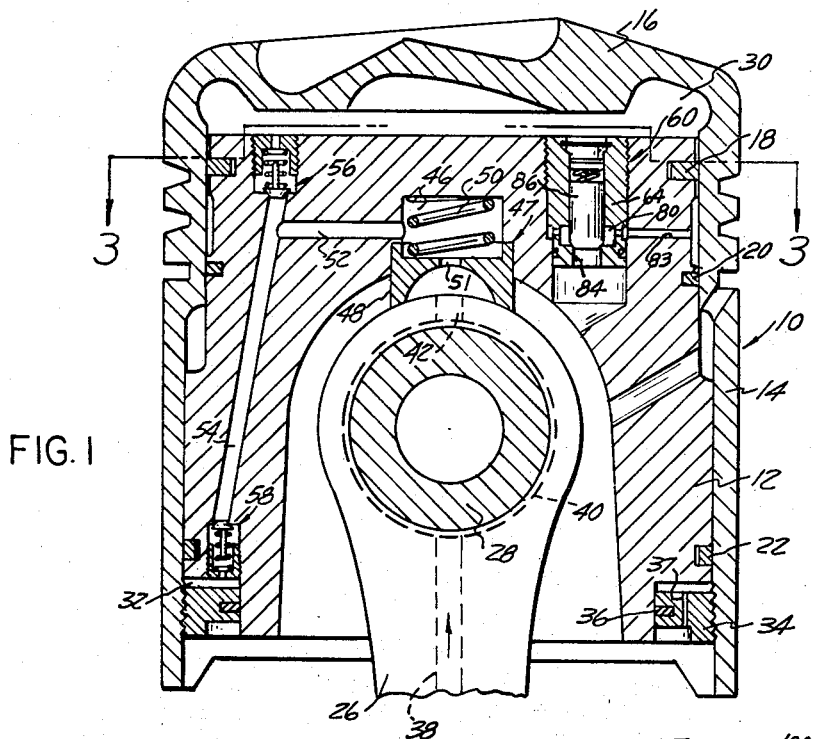
FIG. 1 is a longitudinal cross-sectional view of a piston assembly embodying the construction of the present invention.

Now referring to the drawings for a more detailed description of the present invention a preferred variable compression ratio (VCR) piston 10 is therein illustrated as comprising an inner member or piston pin carrier 12 carrying on its outer surface an outer member or shell 14. The outer member 14 has a crown 16 which serves as the head of the piston 10 and which forms a movable wall of the lower boundary of the combustion chamber of the engine. Inner member 12 is axially slidable within and with respect to the outer member 14 and is provided with rings 18, 20 and 22 which engage the inner surface of the outer member 14. Rings 20 and 22 provide a seal between the adjacent surfaces of inner member 12 and outer member 14 and ring 18 provides the filter means that will be described in more detail as the description proceeds. Inner member 12 is linked to the crankshaft (not shown) of the engine by connecting rod 26 and a wrist pin 28 in the conventional manner.

Thus the inner member 12 is movable axially between fixed upper and lower limits in the manner of a conventional piston while the outer member 14 can move axially upwardly and downwardly relative to the inner member 12 within limits which will be presently described. An upper variable volume chamber 30 is formed intermediate the upper surface of inner member 12 and the lower surface of the crown 16. A lower variable volume chamber 32 is formed intermediate the lower surface formed by an annular recess at the lower end of the inner member 12 and by the upper surface of a ring 34 affixed to the outer member 14. A sealing ring 36 prevents fluid leakage from the lower chamber 32 intermediate the adjacent surfaces of the inner member 12 and the ring 34. Controlled leakage from the lower chamber 32 is permitted through a fixed diameter orifice 37 formed in the ring 34.

The ring 34 and the lower surface of the crown 16 defining the chamber 30 provide the limits of axial movement of the outer member 14 relative to the inner member 12. This relative movement provides a variable height from the center of the wrist pin 28 to the top of the piston crown 16 to thereby vary the compression ratio of the engine by varying the clearance volume of the combustion chamber.

This movement of the outer member 14 relative to the inner member 12 is automatically controlled by regulating the flow of an incompressible fluid into and out of the chambers 30 and 32. The control fluid preferably comprises oil supplied to the piston 10 from the usual pressurized lubricating oil supply of the engine via an oil passage 38 in the connecting rod 26. The passage 38 preferably connects with an annular groove 40 encircling the piston pin 28 and leading to an outlet 42 connected to a cavity 46 formed in the inner member 14. A slipper collector asembly generally indicated at 47 and similar in construction to the assembly disclosed in the aforementioned patents preferably comprises a collector cap 48 carried in the cavity 46 and urged by a spring 50 into sliding, sealing engagement with the upper surface of the connecting rod 26 so that oil is directed from the outlet 42 into the interior of the cap 48 at all positions of the connecting rod 26 with respect to the axis of the wrist pin 28. An opening 51 is provided in the collector cap 48 which directs the oil to a passage 52 formed in the inner member 12 and connecting with a substantially vertical passage 54. The passage 54 connects with the upper chamber 30 through a non-return inlet check valve 56 and with the lower chamber 32 through a non-return inlet check valve 58.

The oil from the lubricating system of the engine is fed to the valves 56 and 58 by way of the passages 38, 40, 42, 51, 52 and 54. Upon a predetermined pressure being produced in the upper chamber 30 oil is discharged to crankcase atmosphere by means of a discharge valve assembly 60 which will be described in more detail as the description proceeds. During the compression stroke and during firing in the combustion chamber the valve assembly 60 limits the maximum allowable pressure in the upper chamber 30 which in turn insures that the engine peak firing pressure will not exceed a predetermined maximum pressure.

The oil is controllably discharged from the lower chamber 32 by means of the fixed orifice 37 to thereby control the amount of relative expansion between the outer member 12 and the inner member 14 since these members can only expand by the amount permitted by the contraction of lower chamber 32. Oil discharged from orifice 37 and from discharge valve 60 returns directly to the crankcase.

General operation

During the latter part of each upward stroke of the piston and the early part of each downward stroke, the inertia of the oil in the connecting rod passage 38, acting upwardly, creates a pressure in the passages 52 and 54. This pressure tends to open the inlet valves 56 and 58 and pump oil into the upper and lower chambers 30 and 32. At the same time the inertia of the outer member 14 also acting upwardly tends to raise the outer member 14 relative to the inner member 12. During the compression and power stroke this tendency is less than the tendency for opposite motion caused by the gas pressure acting on the piston crown 16, but during the exhaust and induction strokes the inertia force predominates. Consequently during the latter part of each exhaust stroke and the early part of each induction stroke, outer member 14 moves upwardly relative to inner member 12 and as a result oil enters upper chamber 30 via the inlet valve 56. Simultaneously lower chamber 32 diminishes in volume and oil is therefore forced out through orifice 37. Lower chamber 32 thus functions as a dash pot and restrains the tendency of outer member 14 to seek the upper limit of its travel. Orifice 37 is sized to insure that outer member 14 will not move relative to the inner member 12 more than a small amount on each exhaust stroke.

During the compression and power strokes the gas pressure acting on piston crown 16 is transmitted to the inner member 12 through the oil in upper chamber 30 creating a high oil pressure in this chamber. Whenever the gas pressure exceeds a selected upper limit, sufficient oil pressure is built up in the upper chamber 30 to open the discharge valve assembly 60 and release some of the oil, allowing the outer member 14 to move downwardly relative to inner member 12 and thus decrease the compression ratio of the engine. The downward relative movement of the outer member 14 enlarges lower chamber 32 at a time when the oil pressure in passages 52 and 54 is high. Consequently the valve 58 opens oil flow to the lower chamber 32 to keep it fully charged.

All of the above described operation assumes that the discharge valve 60 is functioning properly and remains completely closed until the maximum combustion chamber pressure has been achieved. It has been found however that sometimes foreign particles such as metallic chips or the like make their way to the discharge valve assembly and become wedged between the valve face and its seat and thus prevent the valve from closing completely. When this happens of course the valve discharge assembly 60 remains slightly open discharging oil from the upper chamber 30 so that maximum combustion chamber pressure can never be achieved.

The present invention

Figure 2:
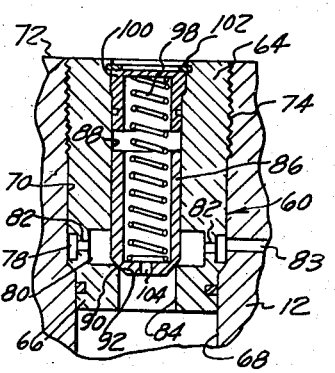
FIG. 2 is an enlarged view of a discharge valve assembly illustrated in FIG. 1.

To prevent this from occurring, the discharge valve assembly 60 has been modified from the construction previously provided and the filter ring 18 has been provided to replace the sealing ring usually mounted in the position occupied by the filter ring 18. As can best be seen in FIGS. 2 and 3 the discharge valve assembly 60 preferably comprises a valve casing 64 reduced in diameter at its lower end 66 to fit closely within a bore 68 formed in the inner member 12 with its axis parallel to the axis of piston 10. The lower end of the bore 68 is open to discharge oil from the valve assembly 60 to the engine crankcase. The upper end of bore 68 opens into a large diameter coaxial bore 70 which extends to the upper surface 72 of inner member 12. Bore 70 is threaded at its upper end to receive threaded portion 74 of casing 64.

The casing 64 has an external annular recess 78 connected to an annular chamber 80 formed within the casing 64 by means of a plurality of annular openings 82. The recess 78 registers with a horizontal passage 83 formed in the inner member 14 and which as can best be seen in FIG. 1, connects to the area between the members 12 and 14 intermediate the rings 18 and 20. Communication between the chamber 80 and a central discharge passage 84 of the casing 64 is controlled by a valve member 86 of the barrel poppet type. Valve member 86 is slidably mounted in a bore 88 coaxial with the discharge passage 84 and bore 68 so that the direction of opening and closing movement of the valve member 86 is parallel to the direction of piston travel. The lower end of the valve member 86 has a frusto-conical surface 90 adapted to seal against right angle internal annular shoulder 92 formed in casing 64 at the junction of the bore 84 and chamber 80. A compression coil spring 98 is disposed within the hollow interior of valve member 86 and extends upwardly therefrom into a spring retainer cup 100 partially inserted in the bore 88 and retained therein by a snap ring 102. The lower end of the valve member 86 has a hole 104 for venting fluid pressure in the spring chamber to the downstream side of the valve member 86.

Figure 3:
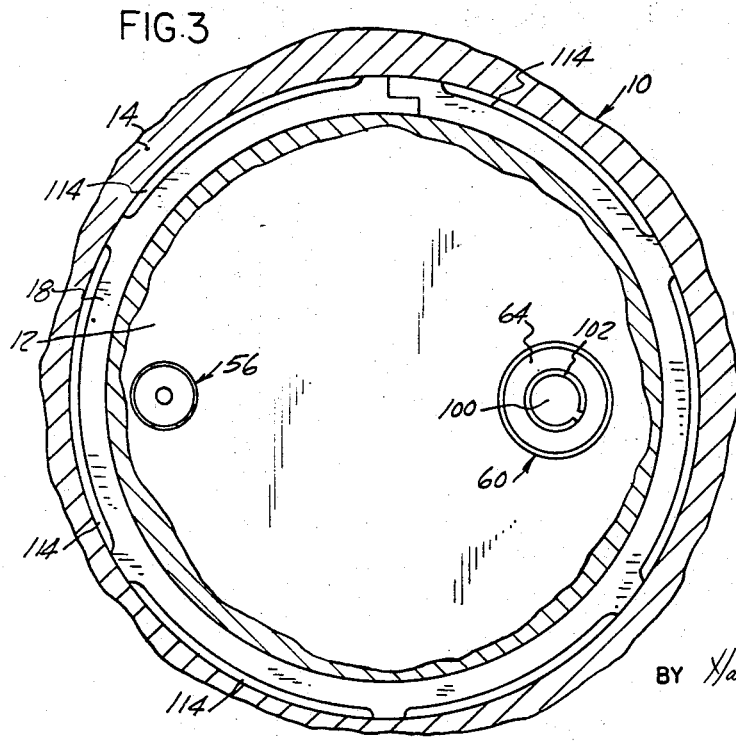
FIG. 3 is a fragmentary view taken substantially along line 2—2 of FIG. 1.

Now referring to FIG. 3, it can be seen that the usual sealing ring disposed intermediate the adjacent surfaces of the inner member 12 and the outer member 14 has been replaced by the filter ring 18. The filter ring 18 is substantially similar to the sealing ring but is provided with a series of arcuately removed portions 114 along its outer edge and at equally spaced points therealong so that oil passing from the upper chamber 32 is directed along the area between the inner member 12 and the outer member 14 through the removed portions 114 of the filter ring 18 and from there to the horizontal passage 83 provided in the inner member 12 and to the chamber 80 formed in the valve assembly 60. Excess pressure acts upon the portion of surface 90 disposed within the chamber 80 to open the valve 86. Thus it is apparent that metal chips or the like which might tend to hold the valve member 86 in an upward unseated position are prevented by the filter ring 18 from reaching the discharge valve assembly 60 so that the danger of this happening is substantially reduced.

It is apparent then that a substantial improvement has been described to insure efficient operation of variable compression ratio piston engines such as those disclosed in the aforementioned patents and in which the construction of the pistons therein disclosed need not be substantially modified to take advantage of the present invention. To provide for the filtering means of the present invention, all that is necessary is to replace the usual sealing ring by the filter ring 18 providing a new discharge valve assembly with a modified construction to provide a passage for directing the oil from the upper chamber past the filter ring before passing to the discharge valve assembly.

It is also apparent that although we have described but a single embodiment of our invention, many changes and modifications can be provided therein without departing from the spirit of the invention or the scope of the appended claims.

Having thus described our invention, we claim:
1. In a variable compression ratio piston for an internal combustion engine having an inner member and an outer member movable relative to one another to vary the compression ratio of the engine, a control system for regulating movement of the members comprising,
    (a) means defining a chamber variable in volume in response to relative movement of said members,
    (b) means for supplying a pressure fluid to said chamber and means for discharging fluid from said chamber upon a predetermined pressure being produced therein, and
    (c) means directing fluid from said chamber between adjacent surfaces of said inner member and said outer member and to said fluid discharging means, and
    (d) filter means being carried by said members along said adjacent surfaces thereof for filtering fluid passing from said chamber to said fluid discharging means.
2. The piston as defined in claim 1 in which said filter means comprises a ring carried by said first member and engaging said second member, said ring having exteriorly removed portions along the outer edge thereof to permit fluid passage therethrough.
3. In a variable compression ratio piston for an internal combustion engine having an inner member and an outer member movable relative to one another to vary the compression ratio of the engine, a control system for regulating movement of the members comprising,
    (a) means defining a first chamber and a second chamber, said chambers varying oppositely in volume with respect to relative movement of said members,
    (b) means for supplying an incompressible fluid to said chambers, means for discharging said fluid from said second chamber at a controlled rate and means for discharging fluid from said first chamber upon a predetermined maximum combustion chamber pressure being produced, and
    (c) filter means disposed on the discharge side of said first chamber for filtering the fluid passing from said first chamber to said first chamber discharging means and comprising means directing fluid from said first chamber between adjacent surfaces of said inner member and said outer member to said first chamber discharging means.
4. The combination as defined in claim 3 and in which said filter means includes a ring carried by said first member and engaging said second member, said ring having exteriorly removed portions along the outer edge thereof to permit fluid passage therethrough.
5. In a variable compression ratio piston for an internal combustion engine having an inner member adapted for connection to the connecting rod of the engine, an outer member carried on and movable axially relative to the inner member so that the crown of the outer member forms a variable boundary of the piston in the combustion chamber of a cylinder of the engine in which the piston reciprocates to thereby vary the compression ratio of the engine, a hydraulic control system for said piston comprising:
    (a) a first and a second chamber defined between said members,
    (b) said first and second chambers varying oppositely in response to said movement of said outer member relatively to said inner member and means remote from said piston for supplying pressure fluid from a source thereof to said first chamber including a unidirectional flow valve,
    (c) a discharge passage from said first chamber of the crankcase of said engine, a pressure regulating discharge valve in said passage permitting fluid flow from said first chamber only when fluid pressure in said first chamber exceeds a predetermined volume, and
    (d) means directing fluid from said first chamber between adjacent surfaces of said inner and outer members to said discharge valve and filter means carried by said members along said adjacent surfaces thereof for filtering the fluid directed from said first chamber to said discharge valve.
6. The combination as defined in claim 5 and in which said filter means comprises a ring carried by said inner member and axially slidably engaging said outer member upon relative movement of said members, means directing fluid from said first chamber past said ring to said discharge regulating valve, said ring including a series of spaced removed portions to permit fluid passage therepast.
7. In a variable compression ratio piston for an internal combustion engine having an inner member and an outer member movable relative to one another to vary the compression ratio of the engine, a control system for regulating movement of the members comprising,
  (a) means defining a chamber variable in volume in response to relative movement of said members,
  (b) means for supplying a pressure fluid to said chamber and means for discharging fluid from said chamber upon a predetermined pressure being produced therein, and
  (c) filter means for filtering fluid passing from said chamber to said fluid discharging means and comprising means directing fluid from said chamber between adjacent surfaces of said inner member and said outer member and to said fluid discharging means.

References Cited

UNITED STATES PATENTS

| 3,156,162 | 11/1964 | Wallace et al. |
| 3,161,112 | 12/1964 | Wallace et al. |
| 3,185,137 | 5/1965 | Dreyer. |
| 3,185,138 | 5/1965 | Druzynski. |
| 3,303,831 | 2/1967 | Sherman. |
| 3,311,096 | 3/1967 | Bachle et al. |

WENDELL E. BURNS, *Primary Examiner.*

U.S. Cl. X.R.

123—47, 48; 91—422